United States Patent
Benda et al.

(10) Patent No.: US 6,244,127 B1
(45) Date of Patent: Jun. 12, 2001

(54) MECHANICAL OR ELECTRICAL TRANSMISSION SHIFTER

(75) Inventors: Thomas Benda, Einbeck; Matthias Scheidling, Freiberg, both of (DE)

(73) Assignee: Teleflex, Incorporated, Plymouth, Meeting, PA (US)

( * ) Notice: Subject to any disclaimer, the term of this patent is extended or adjusted under 35 U.S.C. 154(b) by 0 days.

(21) Appl. No.: 09/428,939

(22) Filed: Oct. 28, 1999

(51) Int. Cl.[7] .................................................... F16H 59/02
(52) U.S. Cl. ..................................... 74/473.15; 74/473.12
(58) Field of Search ................................. 74/473.12, 335, 74/473.33, 473.3, 473.1, 473.14, 473.15, 473.36

(56) References Cited

U.S. PATENT DOCUMENTS

| | | |
|---|---|---|
| 1,942,115 | 1/1934 | Milone . |
| 4,489,303 | 12/1984 | Martin . |
| 4,507,601 | 3/1985 | Andresen . |
| 4,610,179 | 9/1986 | Parker . |
| 4,660,430 | 4/1987 | Bortfeld et al. . |
| 5,255,570 | 10/1993 | Shirahama et al. . |
| 5,406,860 | 4/1995 | Easton et al. . |
| 5,537,885 | 7/1996 | Thomas . |
| 5,718,312 | 2/1998 | Osborn et al. . |
| 5,875,679 | 3/1999 | Salecker et al. ........................ 74/335 |
| 6,016,717 | * 1/2000 | Wheeler .............................. 74/473.12 |
| 6,082,213 | * 7/2000 | Skogward .......................... 74/473.18 |

FOREIGN PATENT DOCUMENTS

| | | |
|---|---|---|
| 3836145 | 4/1990 | (DE) . |
| 0872670 | 10/1998 | (EP) . |
| 9732746 | 9/1997 | (WO) . |
| 9903696 | 1/1999 | (WO) . |

* cited by examiner

Primary Examiner—Charles A Marmor
Assistant Examiner—Saúl Rodríguez
(74) Attorney, Agent, or Firm—Howard & Howard

(57) ABSTRACT

A transmission shift control assembly comprising a housing (12) presenting a support (16) and a lever (18) pivotally is supported by the housing (12) for movement between shift positions. A mechanical connection (20) produces rectilinear movement in response to pivotal movement of the lever (18) and a core element (28) is connected to the mechanical connection (20) for receiving the rectilinear movement. A casing (30) movably supports the core element (28) and is supported in the support (16). The casing (30) includes a swivel tube (32) supported by a fitting (34) for swiveling movement relative thereto. The invention is characterized by an electrical sensor (46) supported by the swivel tube (32) for measuring the rectilinear movement of the core element (28).

6 Claims, 2 Drawing Sheets

MECHANICAL OR ELECTRICAL TRANSMISSION SHIFTER

BACKGROUND OF THE INVENTION

1. Field of the Invention

The subject invention relates to a transmission shift control assembly of the type including a shift lever for shifting the transmission between positions.

2. Description of the Prior Art

Such transmission shift control assemblies are well known for use in shifting the transmission in automotive vehicles. It has been customary to connect motion transmitting remote control assemblies to the shift control assemblies for transmitting mechanical motion to the transmission. However, recent developments have lead to the use of electrical control of the transmission. This would naturally lead to the tooling of two different shifter inputs, one mechanical and one electrical.

SUMMARY OF THE INVENTION AND ADVANTAGES

A transmission shift control assembly comprising a housing presenting a support and a lever pivotally supported by the housing for movement between shift positions. A mechanical connection produces rectilinear movement in response to pivotal movement of the lever and a core element is connected to the mechanical connection for receiving the rectilinear movement. A casing movably supports the core element and is supported in the support. The invention is characterized by an electrical sensor supported by the casing for measuring the rectilinear movement of the core element.

Accordingly, the subject invention provides a shifter control assembly which can be used for either mechanical or electrical control of the transmission of an automotive vehicle.

BRIEF DESCRIPTION OF THE DRAWINGS

Other advantages of the present invention will be readily appreciated as the same becomes better understood by reference to the following detailed description when considered in connection wit the accompanying drawings wherein.

DETAILED DESCRIPTION OF THE PREFERRED EMBODIMENT

Figure 1:
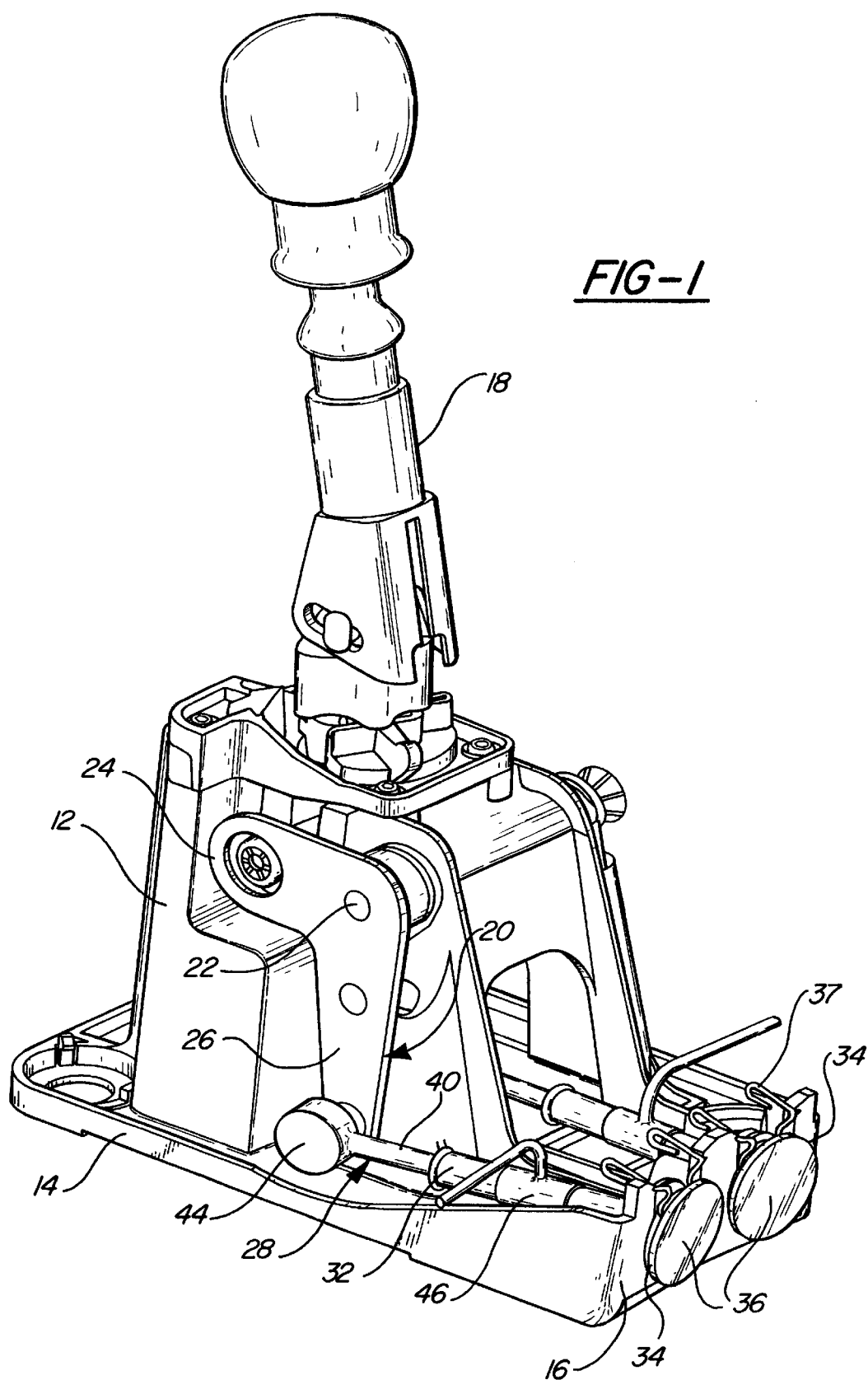
FIG. 1 is a perspective view of the subject invention.

Referring to the Figures, wherein like numerals indicate like or corresponding parts throughout the several views, a transmission shift control assembly is shown in FIG. 1. The shift control assembly includes a housing 12 having a base 14. The base 14 includes a bottom and a vertical wall which presents a support 16.

A lever 18 is pivotally supported by the housing 12 for movement between shift positions, as is well known in the art. A mechanical connection, generally indicated at 20, produces rectilinear movement in response to pivotal movement of the lever 18. More specifically, the connection 20 comprises a crank rotatably supported by the housing 12 on an axis 22 and including a first arm 24 connected to the lever 18 and a second arm 26.

A core element, generally indicated at 28, is connected to the second arm 26 of the mechanical connection 20 for receiving the rectilinear movement.

A casing, generally indicated at 30, movably supports the core element 28 and is supported in the support 16. The casing 30 includes a swivel tube 32 supported by a fitting 34 for swiveling movement relative thereto. The fitting 34 is attached to the support 16 by an annular groove which seats in a U-shaped seat in the support 16. A spring clip 37 for retaining the fitting 34 in the U-shaped seat in the support 16. The swivel tube 32 includes a male spherical portion 33 and the fitting 34 includes a female spherical pocket 35 slidably engaging and supporting the male spherical portion.

Figure 2:
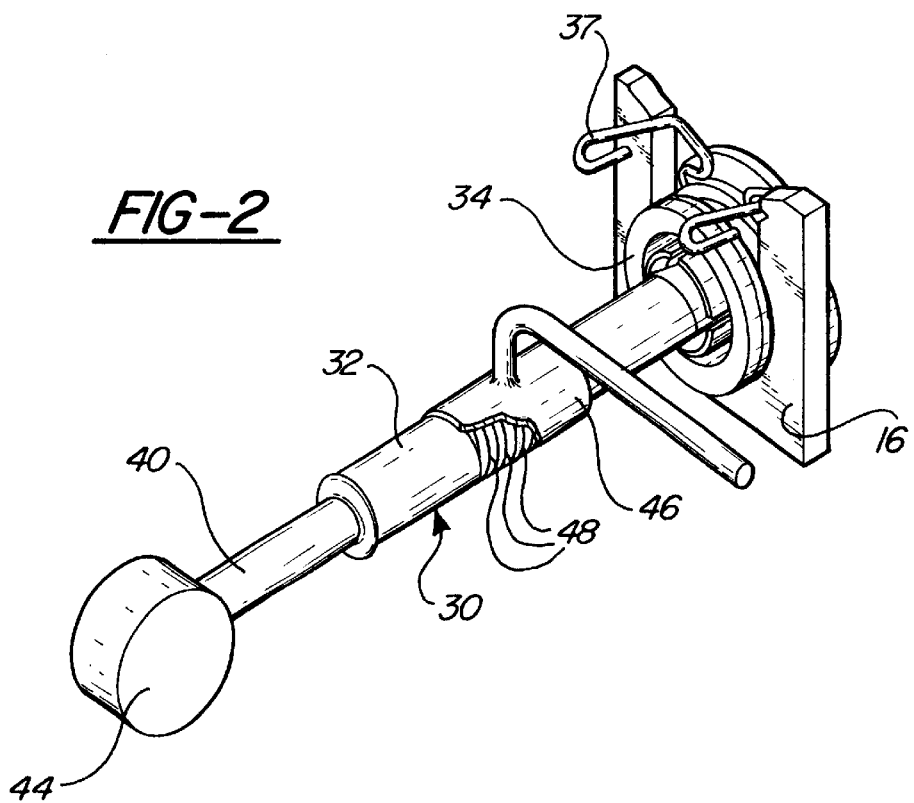
FIG. 2 is a perspective view of one modification of the invention.
Figure 3:
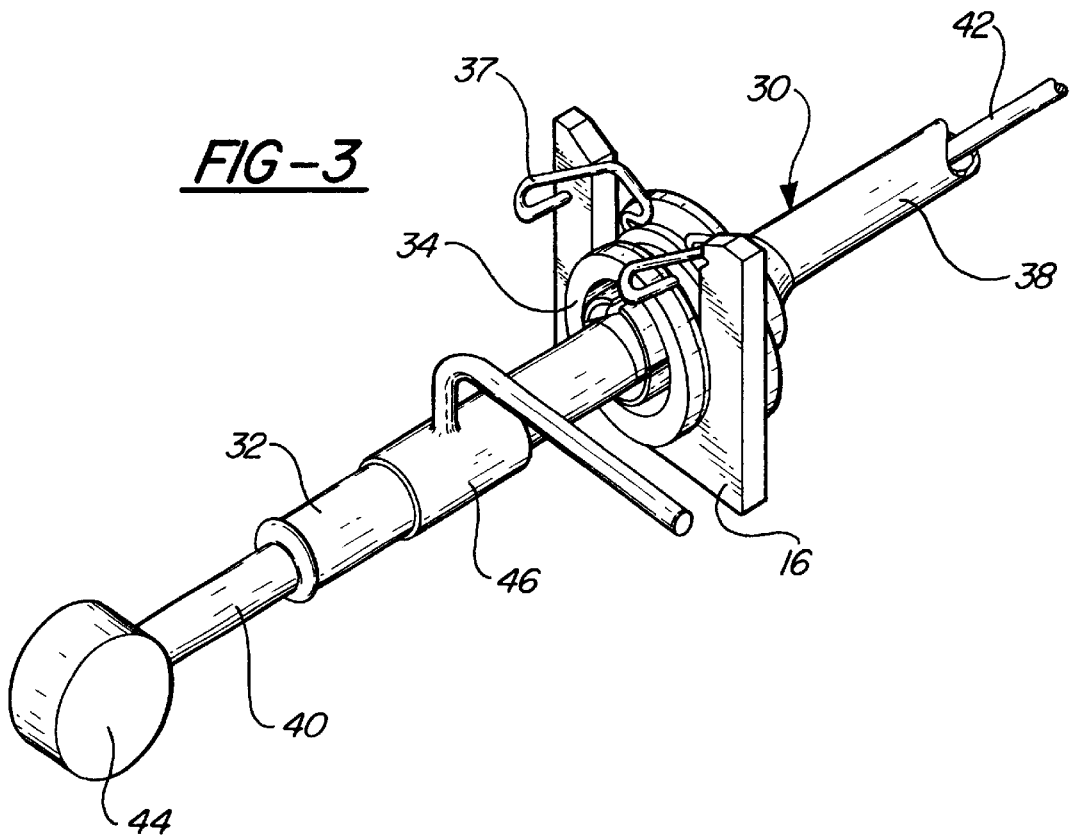
FIG. 3 is a perspective view of a second modification of the invention.

In the modification of FIGS. 1 and 2, the fitting 34 includes a closed end for sealing the fitting 34 about the swivel tube 32. Whereas, in the modification of FIG. 3, the casing 30 includes a conduit 38 extending from the fitting 34 and the core element 28 extends into and is movably supported by the conduit 38. The core element 28 includes a metal plunger or rod 40 slidably supported for the rectilinear movement in the swivel tube 32 and, in the case of FIG. 3, also includes a cable or wire 42 connected to the plunger or rod 40. The plunger or rod 40 has a female connector 44 for receiving a ball extending from the arm 26.

An electrical sensor 46 is supported by the casing 30 for measuring the rectilinear movement of the core element 28. The electrical sensor 46 includes a plurality of coils 48 wound around the casing 30. An electrical lead 50 extends from the coils 48 for transmitting electrical signals to the on board computer which controls transmission The casing 30 consists of organic polymeric or plastic material and the sensor 46 is embedded in the organic polymeric material. This is preferably accomplished by insert molding the sensor 46 with the swivel tube 32 so that they are bonded or intimately fused together to be equivalent to being integral with the coils 48 being embedded in the organic polymeric material.

As will be appreciated, the invention comprises an electrical sensor 46 supported by the casing 30 of a motion transmitting remote control assembly for measuring the rectilinear movement of the core element 28 thereof.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A transmission shift control assembly comprising;
   a housing (12) presenting a support (16),
   a lever (18) pivotally supported by said housing (12) for movement between shift positions,
   a mechanical connection (20) for producing rectilinear movement in response to pivotal movement of said lever (18),
   a core element (28) connected to said mechanical connection (20) for receiving said rectilinear movement,
   a casing (30) movably supporting said core element (28) and supported in said support (16),
   an electrical sensor (46) supported by said casing (30) for measuring the rectilinear movement of said core element (28), a fitting (34) attached to said support (16), said casing (30) including a swivel tube (32) supported by said fining (34) for swiveling movement relative thereto, said swivel tube (32) including a male spherical portion and said fitting (34) including a female spherical pocket slidably engaging and supporting said male spherical, portion.

2. An assembly as set forth in claim 1 wherein said core element (28) consists of metal and said sensor includes a plurality of coils (48) wound around said casing (30).

3. An assembly as set forth in claim 2 including an electrical lead (50) extending from said coils (48).

4. An assembly as set forth in claim 1 wherein said fitting (34) includes a closed end (36) for sealing said fitting (34) about said swivel tube (32).

5. An assembly as set forth in claim 1 wherein said casing (30) includes a conduit (38) extending from said fitting (34), said core element (28) extends into and is movably supported by said conduit (38).

6. An assembly as set forth in claim 1 wherein said casing (30) consists of organic polymeric material and said sensor (46) is embedded in said organic polymeric material.

* * * * *